(12) United States Patent
Osmon et al.

(10) Patent No.: US 12,106,013 B2
(45) Date of Patent: Oct. 1, 2024

(54) CONVERSATIONAL USER INTERFACES BASED ON KNOWLEDGE GRAPHS

(71) Applicant: INTUIT INC., Mountain View, CA (US)

(72) Inventors: Cynthia Joann Osmon, Sunnyvale, CA (US); Roger C. Meike, Redwood City, CA (US); Sricharan Kallur Palli Kumar, Mountain View, CA (US); Gregory Kenneth Coulombe, Sherwood Park (CA)

(73) Assignee: INTUIT INC., Mountain View, CA (US)

( * ) Notice: Subject to any disclaimer, the term of this patent is extended or adjusted under 35 U.S.C. 154(b) by 461 days.

(21) Appl. No.: 17/449,599

(22) Filed: Sep. 30, 2021

(65) Prior Publication Data
US 2023/0099368 A1    Mar. 30, 2023

(51) Int. Cl.
*G06F 3/16* (2006.01)
*G06F 16/901* (2019.01)
*G06N 5/02* (2023.01)
*G10L 15/22* (2006.01)
*H04L 51/02* (2022.01)

(52) U.S. Cl.
CPC .......... *G06F 3/167* (2013.01); *G06F 16/9024* (2019.01); *G06N 5/02* (2013.01); *G10L 15/22* (2013.01); *H04L 51/02* (2013.01)

(58) Field of Classification Search
CPC ....... G06F 3/167; G06F 16/9024; G06N 5/02; G10L 15/22; H04L 51/02
See application file for complete search history.

(56) References Cited

U.S. PATENT DOCUMENTS

| | | | | |
|---|---|---|---|---|
| 5,860,059 A * | 1/1999 | Aust | ......................... | G06F 3/16 |
| | | | | 704/E15.04 |
| 10,630,840 B1* | 4/2020 | Karp | .................... | H04M 3/5235 |
| 10,904,212 B1* | 1/2021 | Kaizer | ..................... | H04L 51/52 |
| 2009/0164613 A1* | 6/2009 | Saillet | ..................... | H04L 67/02 |
| | | | | 709/223 |
| 2016/0078567 A1* | 3/2016 | Goldman | ............. | G06Q 40/123 |
| | | | | 705/31 |
| 2017/0186098 A1* | 6/2017 | Lubczynski | ......... | G06Q 40/123 |

\* cited by examiner

*Primary Examiner* — Eric Yen
(74) *Attorney, Agent, or Firm* — Patterson + Sheridan, LLP

(57) ABSTRACT

Certain aspects of the present disclosure provide techniques for executing a function in a software application through a conversational user interface based on a knowledge graph associated with the function. An example method generally includes receiving a request to execute a function in a software application through a conversational user interface. A graph definition of the function is retrieved from a knowledge engine. Input is iteratively requested through the conversational user interface for each parameter of the parameters identified in the graph definition of the function based on a traversal of the graph definition of the function. Based on a completeness graph associated with the function, it is determined that the requested inputs corresponding to the parameters identified in the graph definition of the function have been provided through the conversational user interface. The function is executed using the requested inputs as parameters for executing the function.

20 Claims, 7 Drawing Sheets

```
{
    "children": [
    {
        "children": [
        {
            "className": "heading",
            "tag": "h1",
            "type": "text",
            "value": Please choose a size for your pizza"
        },
        {
            "choices": [
            {
                "label": "Slice",
                "value": "SLICE"
            },
            {
                "label": "Personal",
                "value": "PERSONAL"
            },
            {
                "label": "Small",
                "value": "SMALL"
            },
            {
                "label": "Medium",
                "value": "MEDIUM"
            },
            {
                "label": "Large",
                "value": "LARGE"
            },
            {
                "label": "XLarge",
                "value": "XLARGE"
            }
            ],
            "className": "dropdown-pizzaSize",
            "id": "pizzaSize",
            "type": "dropdown",
        }
        ]
    }
    ]
}
```

FIG. 2

CONVERSATIONAL USER INTERFACES BASED ON KNOWLEDGE GRAPHS

INTRODUCTION

Aspects of the present disclosure relate to conversational user interfaces, and more specifically to performing operations within a conversational user interface based on knowledge graphs.

BACKGROUND

Conversational user interfaces generally provide mechanisms by which automated agents can provide answers to user-provided queries. These automated agents may be trained using various models to match user-provided queries to appropriate answers to these questions. For commonly encountered queries (e.g., queries that many users pose to automated agents for resolution), the models generally return relevant answers that are relevant to a user's query. However, for less commonly encountered queries, or "long-tail" queries that, in a statistical distribution, are rarely encountered or have a low probability of occurrence (e.g., are present in a "tail" segment of a statistical distribution rather than a central part of the statistical distribution in which a vast majority of queries are located), the models used by automated agents may not be able to identify a relevant solution to the query. The automated agents may return, a list of suggested articles to a user in response to a long-tail query rather than an answer to the query.

Accordingly, techniques are needed to allow for conversational user interfaces to generate answers to long-tail queries against a knowledge graph.

BRIEF SUMMARY

Certain embodiments provide a computer-implemented method for executing a function in a software application through a conversational user interface based on a knowledge graph associated with the function. The method generally includes receiving a request to execute a function in a software application through a conversational user interface. A graph definition of the function is retrieved from a knowledge engine. The graph definition of the function generally identifies parameters used in executing the function. Input is iteratively requested through the conversational user interface for each parameter of the parameters identified in the graph definition of the function based on a traversal of the graph definition of the function. Based on a completeness graph associated with the function, it is determined that the requested inputs corresponding to the parameters identified in the graph definition of the function have been provided through the conversational user interface. The function is executed using the requested inputs as parameters for executing the function.

Other embodiments provide a computer-implemented method for executing a function through a graphical conversational user interface based on a knowledge graph associated with the function. The method generally includes receiving a request to execute a function in a software application through a graphical conversational user interface. A graph definition of the function and a user interface definition for the function are retrieved from a knowledge engine. Generally, the graph definition of the function identifies parameters used in executing the function. Input is iteratively requested through the graphical conversational user interface for each parameter of the parameters identified in the graph definition of the function based on a traversal of the graph definition of the function and the user interface definition for the function. It is determined, based on a completeness graph associated with the function, that the requested inputs corresponding to the parameters identified in the graph definition of the function have been provided through the graphical conversational user interface. The function is executed using the requested inputs as parameters for executing the function. A user interface definition including a result of executing the function is transmitted to the graphical conversational user interface.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 2 illustrates an example user interface definition used by a conversational user interface to execute a function in a software application based on a knowledge graph.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
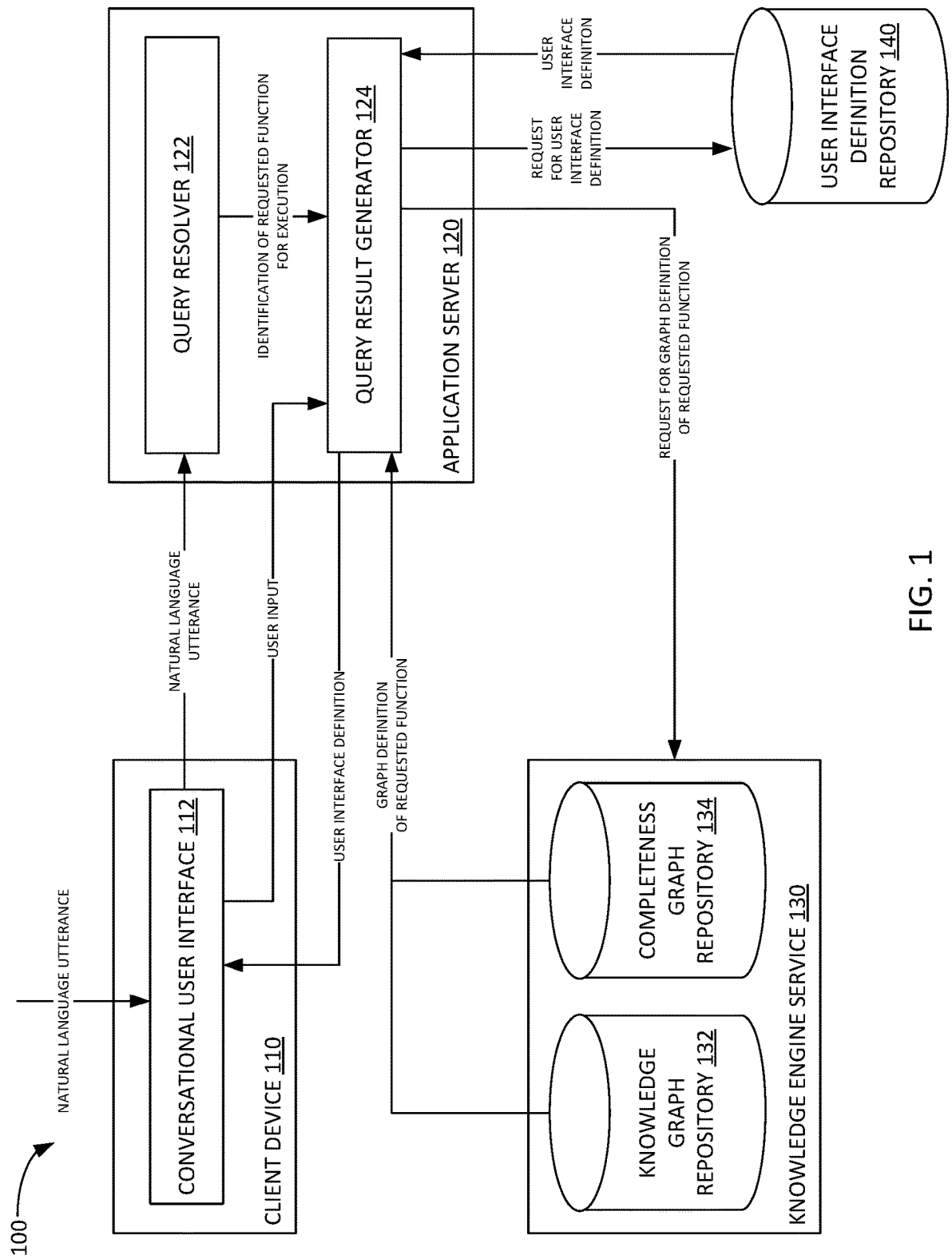
FIG. 1 depicts an example computing environment in which a conversational user interface executes a function in a software application based on a knowledge graph.

Graph structures generally represent relationships between data and operations as connections between nodes in a graph, where the nodes represent data provided by a user of an application and/or operations performed by an application and edges between nodes represent relationships between different nodes in the graph (e.g., data and/or operational dependencies, etc.). These graph structures may be established as directed graphs, in which nodes representing inputs to a given node are connected to the given node using directional constructs, such as unidirectional edges or connections that point from a source node to the given node. Because graphs can be used to define input and output relationships for a function in an application, graphs may be a useful mechanism by which an application can be defined.

In some cases, an application may be defined using a knowledge graph structure. In a knowledge graph structure, nodes in the knowledge graph may encode various rules for performing an operation. For example, a node may include rules that define required and optional inputs for a function and specify the output generated based on the required and optional inputs. Further, in the knowledge graph, nodes may be connected in a continuous path from a root node, which may represent the entry point into an operation or a series of related operations in an application, to one of a plurality of a terminating nodes representing the final actions to be performed for and the results generated from executing the operation or series of related operations.

For example, in an accounting application, a knowledge graph may define an operation for tracking accounts payable as a series of connected nodes encoding rules that, when executed, results in a summation of amounts in unpaid invoices received during a given time period. In another example, in a time tracking application, a knowledge graph may define an operation for tracking overtime for any given week as a series of connected nodes encoding rules that, when executed, results in a summation of hours worked for each day of a week, less an amount of time expected to be worked during that week. Because knowledge graphs describe operations in terms of inputs and rules applied to those inputs (and any intermediate calculations) to generate a result, knowledge graphs may be used in various applications to allow users to request the result of an operation, given some set of inputs.

Conversational user interfaces allow users to pose queries against a knowledge graph using natural language inputs. A conversational agent in a conversational user interface may use a natural language understanding model to answer received natural language queries (or questions). The natural language understanding model may be trained using a training data set of utterances to map words in various natural language utterances to various nodes in the knowledge graph. For example, the natural language understanding model can be trained using a corpus of queries commonly posed by users of a software application and information about the content associated with nodes in a knowledge graph to map various keywords in natural language utterances to the appropriate nodes in the knowledge graph.

Some queries received from a user of a software application may not be mapped by a natural language understanding model to specific nodes in the knowledge graph. These queries may be, for example, queries that are asked infrequently (long-tail queries), queries that involve performing operations using data from multiple nodes in the knowledge graph, and the like. When conversational agents encounter such queries and determine that the natural language understanding model is unable to handle such queries (e.g., provide an answer to such a query), conversational agents may revert to other less helpful techniques for providing information to a user in response to such questions. For example, a conversational agent can use keyword searches to search a help repository and identify articles in the help repository that are potentially relevant to a received query. However, generating lists of potentially relevant articles by searching a help repository may not provide a satisfactory answer to a user's query.

Aspects of the present disclosure provide techniques for processing long-tail queries based on knowledge graphs associated with a function to be executed through a conversational user interface. By using knowledge graphs to execute functions in an application through a conversational user interface, various operations may be performed against data in the knowledge graph regardless of a number of inputs needed to be input to execute the function. Inputs may be requested iteratively until the inputs needed to execute the function are input through the conversational user interface, and once the inputs needed to execute the function are input through the conversational user interface, the function can be executed and a result generated from executing the function may be output through the conversational user interface. Thus, conversational user interfaces can be used to generate usable answers to received queries instead of suggested articles or other information that may be tangentially related to a received query or otherwise not provide a satisfactory answer to the received query. Beneficially, then, conversational user interfaces can be used to execute functions of varying complexity, allowing for answers to queries to be generated based on knowledge graph constructs rather than a list of suggested articles or other information that may provide information related to a function, but not a result of executing the function By processing queries through conversational user interfaces based on knowledge graphs, conversational user interfaces may be made highly scalable. These conversational user interfaces may allow for iterative user input into a computing system until the inputs needed to execute a function are received, which may allow for conversational user interfaces to be used to answer queries of varying complexity. Further, because conversational user interfaces can use knowledge graph constructs to execute functions in a software application, conversational user interfaces need not be hard-coded to execute specific functions in the software application. For example, in systems in which functions executable through a conversational user interface are manually defined, these conversational user interfaces may manually define interactions that allow for specific operations to be executed within the software application. However, manual definition of the functions supported by software application and answerable through a conversational user interface is not scalable, as different queries may be posed by different users to a conversational user interface and an exhaustive list of these queries may be difficult to maintain. With 1-to-1 mappings of intents extracted from received queries that describe an action a user is attempting to perform or of the received queries themselves to specific operations over specific inputs, the number of combinatorial mappings may be impracticably large, making answering queries in a conversational user interface an intractable problem in practice. In contrast, the techniques discussed herein may allow for conversational user interfaces to process queries over a large universe of operations, making answering queries in a conversational user interface a tractable problem in computing systems and reducing the amount of processing power needed to identify operations to perform through conversational user interfaces. Further, queries of varying degrees of complexity may be answered with a result derived from user-provided data in a knowledge graph rather than a list of articles that may not be relevant to the query posed by a user and may not use data already provided by the user to the knowledge graph.

Example Conversational User Interfaces Based On Knowledge Graphs

FIG. 1 illustrates an example computing environment 100 in which a conversational user interface executes functions exposed by a software application based on knowledge graphs defining these functions. The conversational user interface may be a separate component from the software application that the conversational user interface interfaces with in order to execute the functions exposed by the software application or may be integral to the software application. As illustrated, computing environment 100 includes a client device 110, an application server 120, a knowledge engine service 130, and a user interface definition repository 140.

Client device 110 generally exposes a conversational user interface 112 through which a query including a natural language utterance is received for processing. Client device 110 generally represents a device on which a conversational user interface 112 may be presented to a user and through which user-provided data may be provided to application server 120 for processing. These client devices 110 may include devices that can present conversational user interface 112 visually, such as desktop computers, laptop computers, tablets, smartphones, or other computing devices that allow for user interactions through one or more visual output devices. In some aspects, these client devices 110 may also or alternatively support audio-based interaction; these devices may include, for example, smart speakers or computing devices on which audio-based assistants allow for user interaction with the computing devices.

The natural language utterance may be received as a text string or as an audio file from which a text string can be extracted. The natural language utterance may be received, for example, from an application executing on a client device (e.g., a desktop computer, laptop computer, smartphone, tablet computer, etc.) or from an application instance executing on a server or cluster of servers. Generally, the natural language utterance includes a query about an operation performed by an application associated with conversational user interface 112 or data generated by the application.

To satisfy the query, conversational user interface 112 can provide the input natural language utterance to application server 120 for resolution. In response to a natural language utterance identifying the function to be executed through conversational user interface 112, conversational user interface 112 can receive user interface data identifying an input to be provided through the conversational user interface 112 and the manner by which the identified input is to be provided through conversational user interface 112. Requested inputs can be provided to application server 120, and in response, conversational user interface 112 can receive information defining the functionality and layout of a user interface for obtaining a subsequent input for use in executing the function identified in the natural language utterance provided to application server 120. When the inputs needed to execute the function have been provided to application server 120 through conversational user interface 112, the function can be executed based on the inputs provided to application server 120 through conversational user interface 112. Subsequently, the result of executing the function based on these inputs can be generated and output to a user of client device 110 through conversational user interface 112.

Application server 120 generally represents a computing device through which execution of various functions can be invoked by conversational user interface 112 and which can execute one or more functions in a software application based on input received from client device 110 through conversational user interface 112. As illustrated, application server 120 includes a query resolver 122 and a query result generator 124.

To identify a function to be executed through conversational user interface 112, application server 120 can initially process the natural language utterance through a query resolver 122. Query resolver 122 generally uses a natural language understanding model trained using a corpus of data from a graph construct (e.g., a knowledge graph exposed by knowledge engine service 130) to identify the function to be executed within a software application. To do so, query resolver 122 can extract information from the natural language utterance, such as an intent of the natural language utterance, and attempt to match the extracted information to one or more nodes in the graph construct. The intent of the natural language utterance may be extracted based on a machine learning model that has been trained to recognize mappings between the meaning of a natural language utterance (e.g., the specific actions that a user has requested to be performed and/or the specific data that the user has requested to be retrieved) and specific nodes in the graph construct representing data that has been input into the graph construct, the results of calculations performed based on the data input into the graph construct, or functions exposed by a software application and defined by a graph construct. This machine learning model may be a natural language understanding model trained to extract information from a natural language utterance and match the extracted information to nodes in the graph construct. For example, to extract an intent, the machine learning model used by intent-based query resolver 122 can use techniques such as part-of-speech tagging to identify entities in the natural language utterance and match the extracted entities to entities specified as answerable by nodes in the graph construct. The machine learning model can identify these entities based, for example, on word matching techniques, generating embedding values for each word relative to the names of nodes in a graph construct, or other word-recognition/comparison techniques.

If query resolver 122 identifies a match between an extracted intent from the natural language utterance and a node in the graph construct, query resolver 122 can return a value associated with the matching node as a response to the natural language utterance. In some cases, intent-based query resolver 122 can identify a match between an extracted intent and a node in the graph construct based on a match score. If the match score exceeds a threshold value, intent-based query resolver 122 can determine that a match exists between an intent of the natural language utterance and a node in the graph construct and provide an identification of the requested function to query result generator 124 for execution.

Otherwise, intent-based query resolver 122 can determine that the received natural language utterance is a long-tail query and proceed to process the query based on extracting operators and operands from the natural language utterance. Generally, operands included in a natural language utterance may refer to data nodes in a knowledge graph on which an operation is to be performed, and operators included in a natural language utterance may refer to a function to be performed on the data from the data nodes in the graph construct associated with the operands. For example, a natural language utterance such as "what is my total dividend income" in a financial management application may specify the function to be executed as an addition operation (e.g., associated with the word "total" in the natural language utterance) and the data to be used in executing the function as dividend income recorded for the user in one or more data records in an associated data repository.

Query result generator 124 generally uses information about the identified function to generate a result for the natural language query input by a user into application server 120. To do so, query result generator 124 can request a graph definition for the identified function from a knowledge engine service 130. The graph definition for the identified function may include a knowledge graph and a completeness graph. Generally, the knowledge graph may include information defining the functions used in identifying the function, and the completeness graph may include information identifying mandatory and optional inputs for the identified function. As discussed in further detail below, query result generator 124 can use the knowledge graph and completeness graph to iteratively request input from client device 110 and execute the function based on the input received from client device 110 when the mandatory inputs have been received from client device 110.

Figure 4:
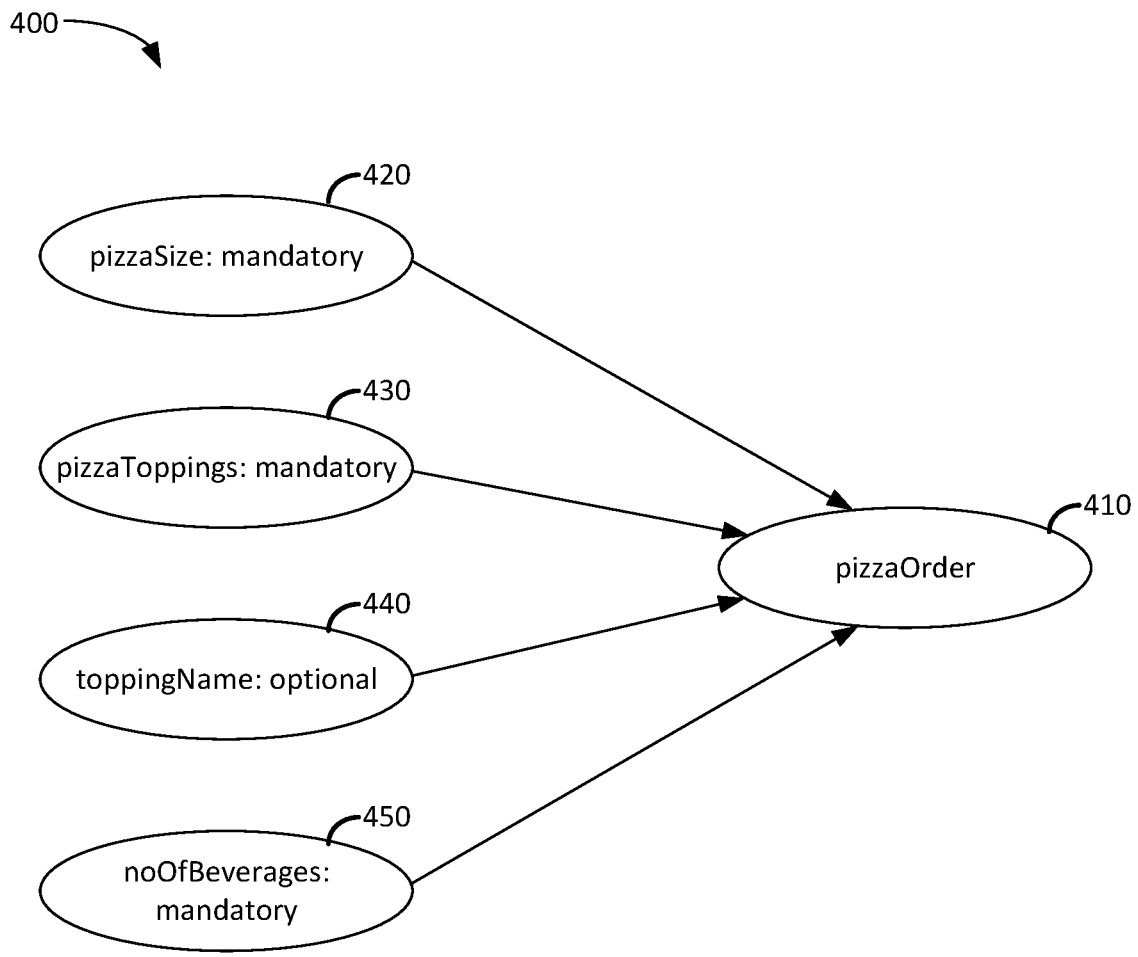
FIG. 4 illustrates a completeness graph used to execute a function in a software application through a conversational user interface.

To execute the identified function, query result generator 124 can traverse the graph definition of the function (as illustrated in FIG. 4 and described in further detail below) to iteratively identify inputs to be provided from client device 110. Generally, the graph definition of the function may include a plurality of nodes, and each node in the graph definition may be associated with an input parameter for the identified function and a user interface definition. The user interface definition may include information identifying one or more user interface controls to present through the conversational user interface in order to obtain a value for the input parameter. A graph definition of the function may, for example, specify the result of the identified function as the root node of the graph definition, with child nodes representing inputs that are to be provided in order to execute the function. Generally, deeper nodes in the graph definition of the function may represent inputs used to calculate a result of nodes at higher levels in the graph definition of the function. That is, for a graph definition of a function with depth n, nodes at depth n may represent the initial inputs needed to execute the function associated with the knowledge graph, nodes at depth n−1 may represent a result generated based on the inputs received for the nodes at depth n, and so on.

Generally, for each input identified in the knowledge graph, query result generator 124 can retrieve a user interface definition associated with the input from user interface definition repository 140 and provide the user interface definition to conversational user interface 112 for presentation to the user of client device 110. In some aspects, query result generator 124 can request a user interface definition associated with the input from user interface definition repository 140. In response, user interface definition repository 140 can provide a definition of the user interface to be presented to a user of client device 110 through conversational user interface 112.

In some aspects, the definition of the user interface may be a parseable data stream, such as a JavaScript Object Notation (JSON) payload, an eXtensible Markup Language (XML) file defining the user interface, or the like, that may be forwarded to conversational user interface 112 for rendering. In some aspects, where application server 120 serves requests from client devices with varying input and output devices, query result generator 124 can provide information about the capabilities of the client device 110 in requesting the user interface definition to forward to client device 110. For example, query result generator 124 can provide, in the request, information specifying whether or not the client device 110 has or is otherwise connected with a display device on which a graphical user interface for requesting the input can be displayed. If the client device 110 does not include or is not connected with a display device, query result generator 124 can request a user interface definition that can be used by an audio output device to request the input. Otherwise, the client device 110 can request a user interface definition that can be rendered on a display device to request the input from a user of client device 110.

In some aspects, the graph definition of a function may include information identifying, for each input parameter identified in the graph definition, whether the input is a mandatory input or an optional input for the function. If the input parameter is a mandatory input, and a user attempts to omit the input parameter (e.g., provide a null value in response to a request for the input parameter), query result generator 124 can transmit the user interface definition for the input to the conversational user interface 112 to request that the user provide a valid, non-null, value for the input parameter. If, however, the graph definition of the function identifies an input parameter as an optional parameter, query result generator 124 can proceed to either request another input or calculate a result of the function based on the inputs provided by a user of client device 110 through conversational user interface 112.

To determine whether a sufficient amount of information has been provided as input into application server 120 in order to execute a function in a software application through a conversational user interface 112, query result generator 124 can use a completeness graph to determine whether the mandatory inputs specified by the graph definition of the function have been provided by a user of the client device 110. If the inputs identified in the completeness graph as mandatory inputs have been provided to application server 120, query result generator 124 can execute the function based on the inputs provided to application server 120. Otherwise, query result generator 124 can continue to request user input until the inputs identified as mandatory inputs in the completeness graph are received from the client device 110.

In some aspects, a calculation graph in the graph definition of the function can be used to generate a result of the identified function based on the user inputs provided to application server 120 by client device 110. After generating a result of the function (e.g., based on one or more operations identified in the calculation graph and an order in which these operations are to be performed), a user interface definition (such as the user interface definition 200 illustrated in FIG. 2 and described below) may be generated to output the generated result of the function to the user of client device 110. The user interface definition, including the generated result of the function, may subsequently be output to conversational user interface 112 for display to a user of the client device 110 and the subsequent invocation of one or more other functions in the software application based on the result of the function generated using the calculation graph and output to the user of the client device 110.

Knowledge engine service 130 generally represents a service that provides, upon request from application server 120, graph definitions of specified functions to be invoked and executed by application server 120. As illustrated, knowledge engine service 130 includes a knowledge graph repository 132 and a completeness graph repository 134. Knowledge graph repository 132 may serve as a repository for knowledge graphs defining how a function is to be executed (e.g., the operations to be performed in order to execute the function). Completeness graph repository 134 may service as a repository for corresponding graphs defining mandatory and optional inputs for executing a corresponding function defined in knowledge graph repository 132.

It should be recognized that FIG. 1 illustrates one example in which a conversational user interface executes functions exposed by a software application based on knowledge graphs defining these functions. However, it should also be recognized that other implementations are possible, and the example illustrated in FIG. 1 is not limiting of the techniques by which a conversational user interface executes functions exposed by a software application based on knowledge graphs defining these functions.

Example Conversational User Interface

FIG. 2 illustrates an example user interface definition 200 used by a conversational user interface (such as conversational user interface 112 illustrated in FIG. 1) to execute a function in a software application based on a knowledge graph.

As illustrated, user interface definition 200 includes a plurality of user interface element definitions 202 and 204. Each user interface element definition 202, 204 generally includes information identifying user interface elements to be rendered within a conversational user interface in order to obtain an input for the function in the software application being executed through the conversational user interface. In user interface definition 200, a first user interface element definition 202 may specify a prompt to display in the conversational user interface. This prompt may reference a class name in a style sheet, defining the visual look and feel of the prompt. The first user interface definition 202 also includes instructions identifying how the prompt is to be rendered (e.g., the tag "h1", referencing the largest header size in the hypertext markup language (HTML) specification) and the text to be rendered in the conversational user interface for the prompt.

User interface element definition 204, meanwhile, illustrates a selectable drop-down box in which a user can select one of a plurality of options in order to provide a requested input for the function executed in the software application through the conversational user interface. In this example, user interface element definition 204 defines the type of the user interface element to be displayed in the conversational user interface as a "dropdown", assigns an identifier to the drop-down box for use in retrieving a value on submission through the conversational user interface (e.g., through a hypertext transfer protocol (HTTP) POST or GET message, through asynchronous JavaScript and XML (AJAX) messaging, or the like). For the dropdown box defined by user interface element definition 204, the user interface element definition 204 identifies the following options that can be selected for this user interface element. As illustrated, the user can select from the options "Slice", "Personal", "Small", "Medium", "Large", and "XLarge", each of which is associated with a value that can be used by the application to execute the function when the completeness graph is satisfied, as discussed above.

Figure 3:
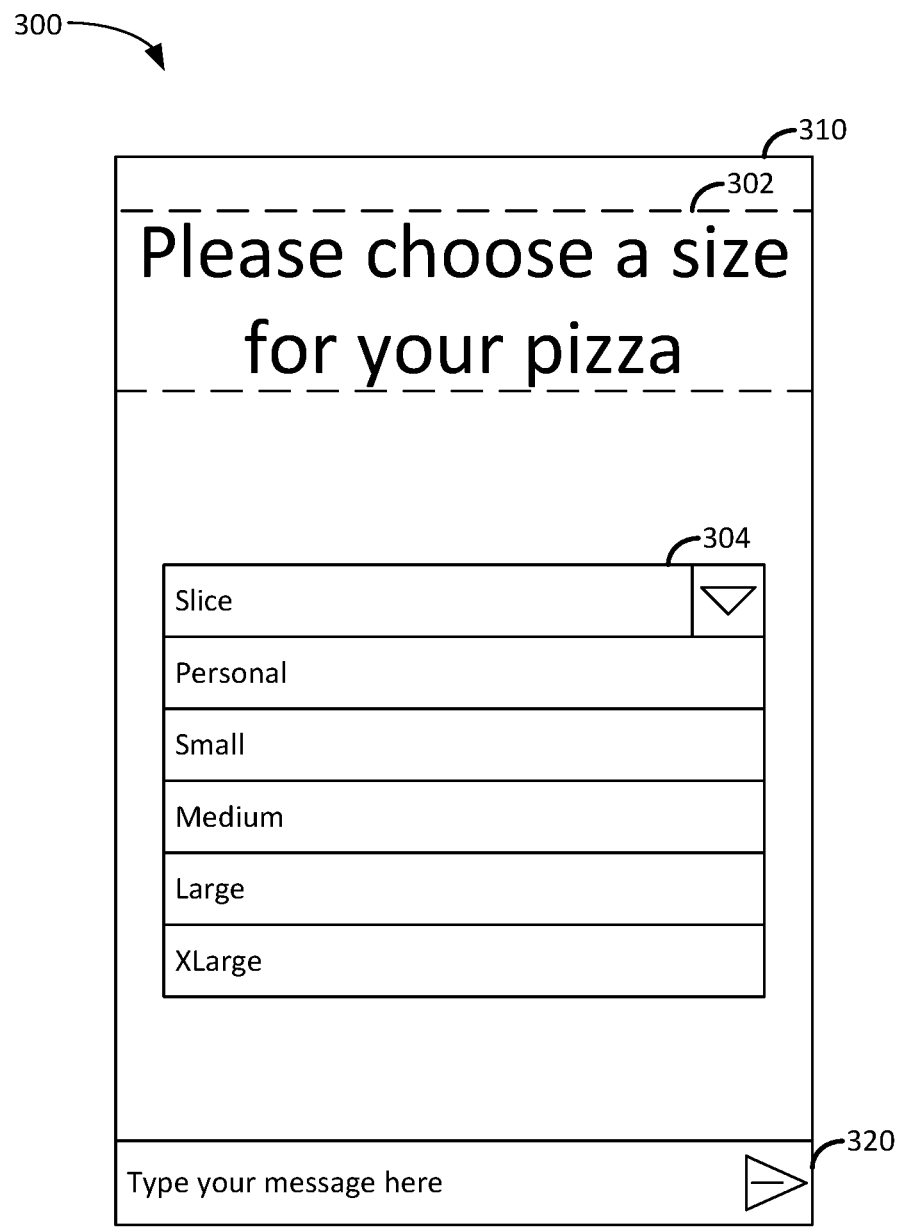
FIG. 3 illustrates an example user interface generated in a conversational user interface based on a user interface definition defining the user interface.

FIG. 3 illustrates the user interface 300 rendered in conversational user interface 112 illustrated in FIG. 1, based on user interface definition 200 illustrated in FIG. 2 and described above. As illustrated, user interface 300 includes a display pane 310 and a conversational user input pane 320. The user interface elements defined in user interface element definitions 202, 204 in user interface definition 200 may correspond to user interface elements 302, 304 rendered in display pane 310. Thus, as illustrated, user interface element 302 may correspond to a textual element defined in user interface element definition 202 illustrated in FIG. 2 (it should be noted that the dashed lines delineating the bounds of the textual element are for illustration only and are not necessarily visible when user interface 300 is rendered and displayed to a user of a software application). Similarly, user interface element 304 may correspond to the drop-down box defined in user interface element definition 204 illustrated in FIG. 2.

When a user submits a selection from the user interface element 304 (e.g., by selecting a specified button rendered (but not shown) in display pane 310, by clicking a designated button or other user interface element in conversational user input pane 320, or the like), an application server can determine whether additional inputs are needed in order to execute the function through user interface 300. If additional inputs are needed, the application server can retrieve another user interface definition corresponding to another one of the inputs and transmit this other user interface definition to a client device for rendering in display pane 310. If, however, the mandatory inputs have been provided to the application server, the application server can execute the function and generate a user interface definition including the result of the function for display in display pane 310.

Example Graphs Used to Execute a Function in a Software Application Through a Conversational User Interface FIG. 4 illustrates an example completeness graph 400 used by an application server to execute a function in a software application through a conversational user interface, such as conversational user interface 112 illustrated in FIG. 1. Generally, a completeness graph may represent a function as a graph for which a condition defined by each child node in the graph is to be satisfied before the function can be executed. In this example, completeness graph 400 represents a completeness graph for executing a pizza ordering function through a conversational user interface. The root node 410 of the completeness graph 400 represents the function to be executed, and each of the child nodes 420, 430, 440, and 450 represent inputs used in executing the function represented by root node 410.

As illustrated, the pizzaOrder function illustrated by root node 410 takes four inputs in order to execute the function. A first input represented by node 420 may correspond to a pizza size parameter, a second input represented by node 430 may correspond to a pizza toppings parameter, a third input represented by node 440 may represent a topping name parameter, and a fourth input represented by node 450 may represent a number of beverages parameter. As illustrated, the pizza size, pizza toppings, and number of beverages parameters identified in nodes 420, 430, and 450, respectively, are mandatory parameters. Because these parameters are mandatory parameters, an application server can block execution of the function until a value for each of these parameters is input into application server. Meanwhile, because the topping name parameter identified in node 440 is an optional parameter, an application server, such as application server 120 illustrated in FIG. 1, can retrieve the user interface definition for this parameter and transmit the user interface definition for this parameter to a client device for rendering through a conversational user interface, such as conversational user interface 112 illustrated in FIG. 1. However, because the topping name parameter is an optional parameter, the application server can proceed to request other inputs for the pizzaOrder function illustrated by root node 410 regardless of whether a non-null value or a null value is received in response to prompting a user for a value for this parameter.

In some aspects, each child node 420, 430, 440, and 450 may include additional information about the formats of the inputs that an application server expects in order to execute the function. The information about the formats of these inputs may be used by the conversational user interface or the application server to determine whether a valid value was received for each parameter specified in the completeness graph 400. If an invalid value was received for a parameter, the conversational user interface or application server can indicate, to a user of the conversational user interface, that the input for that parameter is invalid and request that the user provide a valid input. The conversational user interface and/or application server can block progress within the software application until a valid input is received for the parameter.

Figure 5:
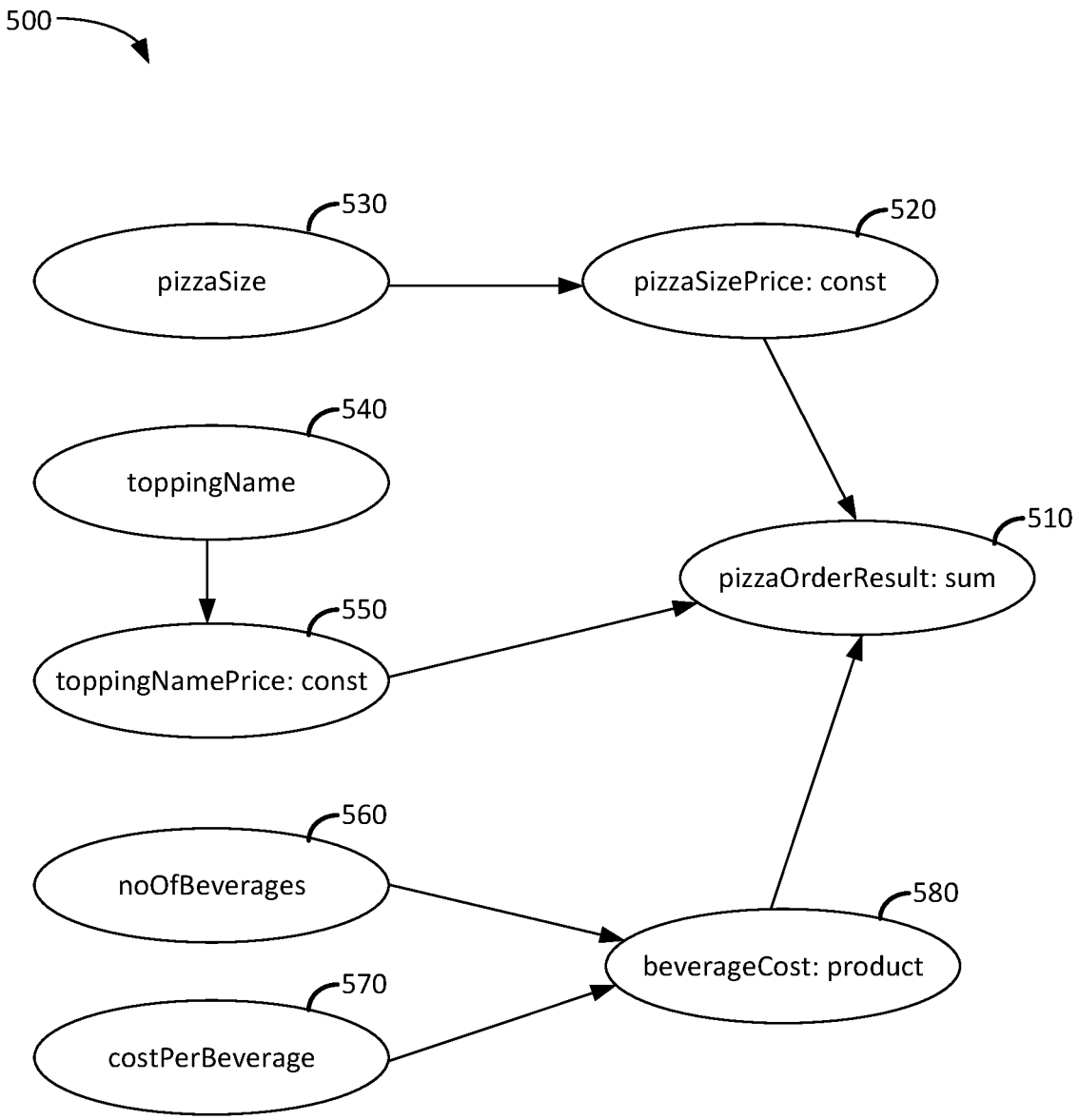
FIG. 5 illustrates a calculation graph used to execute a function in a software application through a conversational user interface.

FIG. 5 illustrates a calculation graph 500 used to execute a function (e.g. at a query result generator 124 illustrated in FIG. 1) in a software application through a conversational user interface, such as conversational user interface 112 illustrated in FIG. 1. Generally, the calculation graph may define how the function identified from a natural language utterance received through a conversational user interface is to be executed, and information in the calculation graph, such as the name of a root node, may be used to identify the intent of the received natural language utterance and invoke execution of the function. As discussed, by identifying an intent of a natural language query based on graph constructs such as a calculation graph 500, aspects of the present disclosure may allow for the execution of various functions in response to long-tail queries (or more commonly received queries) without encountering the intractable problem of implementing an exhaustive list of mappings between intents of a natural language utterance and functions to be executed.

Calculation graph 500 generally specifies the result of the function at root node 510, and child nodes of root node 510 represent various inputs that are used to generate the result of the function. In this example, root node 510 represents the result of the pizzaOrder function illustrated in completeness graph 400 in FIG. 4 and is defined as a sum of a pizza size price value in node 520, a topping name price value in node 550, and a beverage cost value in node 580.

As illustrated, the pizza size price value of node 520 may be one of a plurality of constants. To determine the pizza size price value of node 520, an application server executing the function using calculation graph 500 can use the pizza size input at node 530 to identify the constant value to be input into root node 510 to generate the result of the function. Similarly, the topping name price value of node 550 may be one of a plurality of constants. To determine the topping name price value of node 550, an application server executing the function using calculation graph 500 can use the topping name input at node 540 to identify the constant value to be input into root node 510 to generate the result of the function.

The beverage cost value in node 580 may be represented as a product of multiple values input into the function. As illustrated, the beverage cost value in node 580 may be calculated based on a number of beverages parameter in node 560 and a cost per beverage parameter in node 570. The product of the values of nodes 560 and 570 may be input into a function for calculating the result of the function at root node 510 (in this example, a summation function), and the result of the function may be calculated and output to a conversational user interface for display and to trigger further user interaction with the application.

Figure 6:
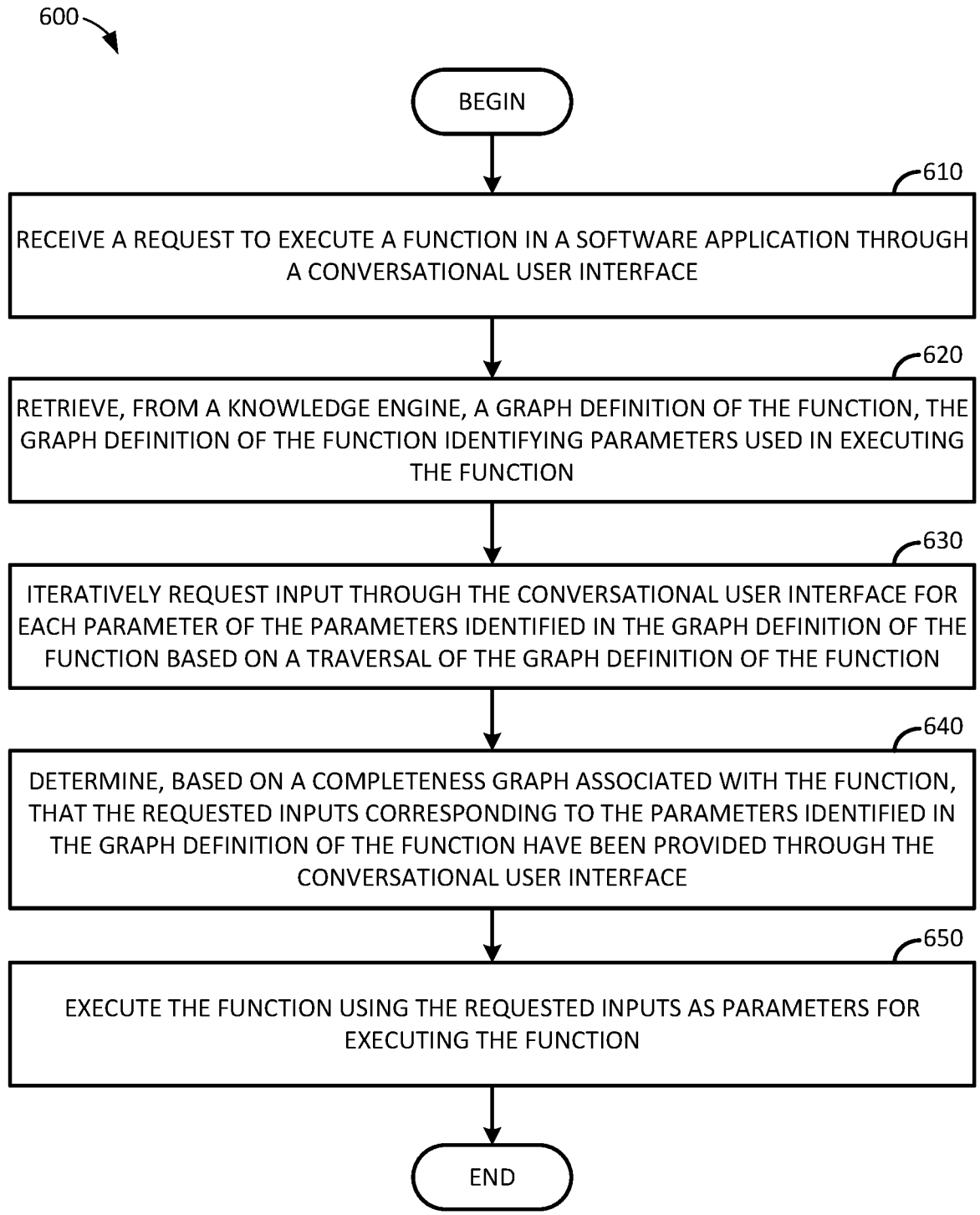
FIG. 6 illustrates example operations for executing a function in a software application through a conversational user interface based on a knowledge graph associated with the function.

Example Execution of Functions in a Software Application Through a Conversational User Interface Based on Knowledge Graphs FIG. 6 illustrates example operations 600 for executing functions in a software application through a conversational user interface. The operations described herein may be performed by an application server (e.g., application server 120 illustrated in FIG. 1) or on a computing device on which an application and a query processor used by the application are deployed.

As illustrated, operations 600 may begin at block 610, where a request to execute a function in a software application through a conversational user interface, such as conversational user interface 112 illustrated in FIG. 1, is received. The request may be, in some aspects, a natural language utterance received through the conversational user interface. The natural language utterance may be received, for example, as textual input or through a voice recognition engine configured to convert an audio input into a textual string.

In some aspects, the request to execute the function in the software application through the conversational user interface may include receiving an utterance through a conversational user interface. An intent may be identified from the received utterance. Based on a mapping of functions in the software application and intents in the conversational user interface, the function to be executed in the software application can be identified.

At block 620, a graph definition of the function is retrieved from a knowledge engine. For example, a query resolver 122 and/or query result generator 124 illustrated in FIG. 1 can retrieve a graph definition of the function from a knowledge engine server 130 illustrated in FIG. 1. Generally, the graph definition of the function can identify parameters used in executing the function. In some aspects, the graph definition of the function can include a plurality of nodes. Each node of the plurality of nodes may be associated with an input parameter for the function and a user interface control to display in the conversational user interface in order to obtain a value for the input parameter. The graph definition of the function may also include information about whether the input parameter is a mandatory parameter or an optional parameter.

At block 630, input is iteratively requested through the conversational user interface for each parameter of the parameters identified in the graph definition of the function. In some aspects, the parameters may be requested based on a traversal of the graph definition of the function. The graph definition of the function may, for example, be a graph structure such as completeness graph 400 illustrated in FIG. 4 and/or calculation graph 500 illustrated in FIG. 5. Generally, the graph definition of the function may represent the function as a series of levels in a graph, where nodes at lower levels of the graph serve as inputs to nodes at higher levels of the graph. Because nodes at lower levels of the graph serve as inputs to nodes at higher levels of the graph, and because the nodes at the lower levels of the graph may be mandatory parameters used to generate values at higher levels of the graph, a depth-first traversal of the graph can be performed to determine an order in which inputs are to be iteratively requested through the conversational user interface. Using a depth-first traversal of the graph, inputs for nodes at the lowest levels of the graph may be requested first, and inputs for nodes at higher levels of the graph may be requested or generated as pre-requisite data is provided to an application server.

In some aspects, as discussed above, nodes in the graph definition of the function may be associated with an indication of whether the input associated with each node is mandatory or optional. For mandatory inputs, iteratively requesting inputs through the conversational user interface may include repeating a request for these mandatory inputs until the mandatory inputs are provided through the conversational user interface. In some aspects, these requests may be repeated until a valid value for the input is received through the conversational user interface.

In some aspects, to iteratively request input through the conversational user interface, a user interface definition may be retrieved from a knowledge engine and output for rendering through the conversational user interface. The user interface definition may specify a user interface for the function or for a portion of the function. For graphical conversational user interfaces, the user interface definition may specify, for each input identified in the graph definition of the function, a prompt to display in the conversational user interface and a type of user interface control through which the respective input is to be entered. For audio-based conversational user interfaces, the user interface definition may specify a prompt to be spoken by the conversational user interface.

At block 640, it is determined, based on a completeness graph associated with the function, that the requested inputs corresponding to the parameters identified in the graph definition of the function have been provided through the conversational user interface. As discussed, the completeness graph may define a function in terms of mandatory and optional parameters. If each of the mandatory parameters have been provided to the application server through the conversational user interface, evaluation of the completeness graph may resolve to a value indicating that the function can be executed (e.g., Boolean true).

At block 650, based on the determination that the requested inputs have been provided through the conversational user interface, the function can be executed using the requested inputs as parameters for executing the function. A result of executing the function can then be output to the conversational user interface. In some aspects, execution of the function may be based on a calculation graph defining an order of operations for the function based on the requested inputs.

Using operations 600 with respect to the pizza ordering example, discussed above with respect to FIGS. 2 through 5, a natural language utterance can be received from a conversational user interface at block 610 to invoke the pizza ordering function. The natural language utterance may be, for example, a string such as "order a pizza" or some other utterance that includes some intent to invoke the pizza ordering function. The natural language utterance is received at a query resolver, such as query resolver 122 illustrated in FIG. 1, which uses the graph constructs defined for various functions to identify the function to be invoked through receipt of the natural language construct. For example, a root node of a completeness graph 400 may be associated with an intent to invoke a pizza ordering function (that may be extracted from various utterances), and based on extracting that intent from the received natural language utterance, the query resolver can identify the pizza ordering function as the requested function for execution and provide information identifying the pizza ordering function as the requested function to a query result generator 124 illustrated in FIG. 1 for execution.

At block 620, the query result generator 124 can retrieve graph definitions of the pizza ordering function from a knowledge engine service 130 illustrated in FIG. 1. The graph definitions may include one or more of the completeness graph 400 illustrated in FIG. 4 and the calculation graph 500 illustrated in FIG. 5.

At block 630, the query result generator 124 can traverse the graph definitions of the pizza ordering function in order to iteratively request input from a user of a software application through a conversational user interface. For example, using a depth-first traversal, the query result generator 124 can identify a first input to be requested in order to execute the function, and can retrieve a user interface definition (e.g., user interface definition 200 illustrated in FIG. 2) associated with the identified first input from a user interface definition repository 140 illustrated in FIG. 1. Query result generator 124 can provide the user interface definition retrieved from the user interface definition repository 140 to a conversational user interface 112 for presentation to a user of a client device 110. After a valid input is received for the first input, the query result generator can identify subsequent inputs to be requested by traversing the graph definitions of the function and iteratively requesting these subsequent inputs.

At block 640, the query result generator determines, based on a completeness graph 400 associated with the pizza ordering function, that the mandatory inputs have been provided to an application server on which the query result generator executes. Subsequently, at block 650, the query result generator uses the calculation graph 500 for the pizza ordering function and the received inputs to generate a result of the requested pizza ordering function. The result for the pizza ordering function (e.g., the cost of the order, a status, etc.) may then be output through the conversational user interface.

Figure 7:
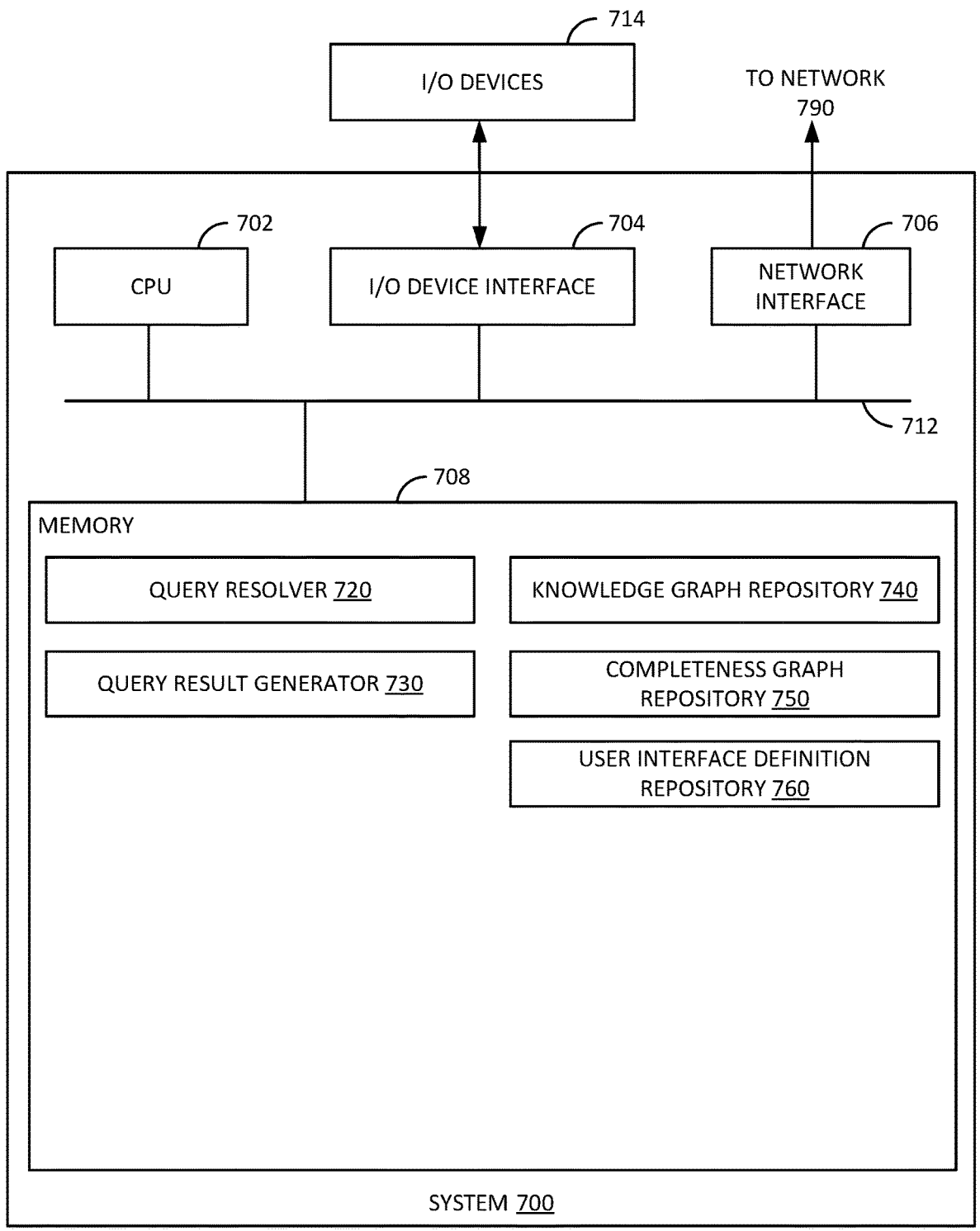
FIG. 7 illustrates an example system on which embodiments of the present disclosure can be performed.

Example System for Executing Functions in a Software Application Through a Conversational User Interface Based on Knowledge Graphs FIG. 7 illustrates an example system 700 configured to perform the methods described herein, including, for example, operations 600 of FIG. 6. In some embodiments, system 700 may act as an application server hosting an application in which functions can be executed through a conversational user interface, such as application server 120 illustrated in FIG. 1. While system 700 is illustrated as a monolithic computing system, it should be recognized that the components illustrated in FIG. 7 may be distributed across one or more computing systems (e.g., in a cloud computing deployment) and need not be implemented on a single computing system.

As shown, system 700 includes a central processing unit (CPU) 702, one or more I/O device interfaces 704 that may allow for the connection of various I/O devices 714 (e.g., keyboards, displays, mouse devices, pen input, etc.) to the system 700, network interface 707 through which system 700 is connected to network 790 (which may be a local network, an intranet, the internet, or any other group of computing devices communicatively connected to each other), a memory 708, storage 710, and an interconnect 712. The I/O devices 714 and/or network interface 707 may be used to receive a query in a natural language utterance through a conversational user interface and output a response to the query generated based on a knowledge graph associated with a function identified from the natural language utterance.

CPU 702 may retrieve and execute programming instructions stored in the memory 708. Similarly, the CPU 702 may retrieve and store application data residing in the memory 708. The interconnect 712 transmits programming instructions and application data, among the CPU 702, I/O device interface 704, network interface 706, and memory 708.

CPU 702 is included to be representative of a single CPU, multiple CPUs, a single CPU having multiple processing cores, and the like.

Memory 708 is representative of a volatile memory, such as a random access memory, or a nonvolatile memory, such as nonvolatile random access memory, phase change random access memory, or the like. As shown, memory 708 includes a query resolver 720, a query result generator 730, a knowledge graph repository 740, a completeness graph repository 750, and a user interface definition repository 760.

Query resolver 720 may correspond to query resolver 122 illustrated in FIG. 1. Query resolver 720 generally receives natural language utterances from a client device and identifies a function to be executed in a software application from the received natural language utterance. Generally, query resolver 720 can extract an intent from the received natural language utterance corresponding to the function to be executed in the software application. These intents may be defined a priori or may be defined based on a universe of function names within the software application. Based on a mapping between intents and functions in the software application, query resolver 720 can identify the function to be executed and provide information about the function to be executed to query result generator 730 for further processing.

Query result generator 730 may correspond to query result generator 124 illustrated in FIG. 1. Query result generator 730 generally uses the identification of the function from query resolver 720 to retrieve knowledge graph constructs and user interface definitions from knowledge graph repository 740 (which may correspond to knowledge graph repository 132 illustrated in FIG. 1), completeness graph repository 750 (which may correspond to completeness graph repository 134 illustrated in FIG. 1), and user interface definition repository 760 (which may correspond to user interface definition repository 140 illustrated in FIG. 1) in order to execute the function. To execute the function, query result generator 730 can retrieve a graph definition of the function from knowledge graph repository and iteratively request inputs through a conversational user interface on a client device using user interface definitions associated with each input defined in the graph definition of the function. When query result generator 730 determines that at least the mandatory inputs for the function have been received from a client device through a conversational user interface, query result generator 730 can execute the function, generate a result, and output the result to at least the conversational user interface on the client device.

While FIG. 7 illustrates an implementation in which a user interacts directly with a system that resolves natural language queries, it should be recognized that one or more servers may interact with system 700 to provide a natural language utterance to system 700 for analysis in order to execute a function in a software application. For example, these servers may host an application that allows a user to input a query as a natural language utterance, and these servers may provide the natural language utterance to system 700 for resolution. System 700 can identify a function to be executed based on the natural language utterance, retrieve user interface definitions associated with inputs needed to execute the function, and transmit the user interface definition(s) back to the application (e.g., via an application hosting a conversational user interface for display or other provision to a user of the application).

EXAMPLE CLAUSES

Clause 1: A method, comprising: receiving a request to execute a function in a software application through a conversational user interface; retrieving, from a knowledge engine, a graph definition of the function, the graph definition of the function identifying parameters used in executing the function; iteratively requesting input through the conversational user interface for each parameter of the parameters identified in the graph definition of the function based on a traversal of the graph definition of the function; determining, based on a completeness graph associated with the function, that the requested inputs corresponding to the parameters identified in the graph definition of the function have been provided through the conversational user interface; and executing the function using the requested inputs as parameters for executing the function.

Clause 2: The method of Clause 1, wherein the graph definition of the function comprises a plurality of nodes, each respective node being associated with a respective input parameter for the function and a respective user interface control to display in the conversational user interface to obtain a value for the respective input parameter.

Clause 3: The method of Clause 2, wherein: each respective node of the plurality of nodes further indicates whether the respective input parameter is a mandatory input for the function, and iteratively requesting input through the conversational user interface for parameters identified in the graph definition of the function comprises repeating requests for mandatory inputs for the function until the mandatory inputs are provided.

Clause 4: The method of any one of Clauses 1 through 3, further comprising retrieving, from the knowledge engine, a user interface definition for the function.

Clause 5: The method of Clause 4, wherein the user interface definition for the function specifies, for each respective input identified in the graph definition of the function, a prompt to display in the conversational user interface and a type of user interface control through which the respective input is to be entered.

Clause 6: The method of any one of Clauses 1 through 5, wherein executing the function using the requested inputs comprises executing the function based on a calculation graph defining an order of operations for the function based on the requested inputs.

Clause 7: The method of any one of Clauses 1 through 6, wherein the request to execute the function comprises a request received through a voice recognition engine.

Clause 8: The method of any one of Clauses 1 through 7, wherein receiving the request to execute the function through the conversational user interface comprises: receiving an utterance through the conversational user interface; identifying an intent from the received utterance; and identifying the function based on a mapping of functions and intents in the conversational user interface.

Clause 9: A method, comprising: receiving a request to execute a function in a software application through a graphical conversational user interface; retrieving, from a knowledge engine, a graph definition of the function, the graph definition of the function identifying parameters used in executing the function; retrieving, from the knowledge engine, a user interface definition for the function; iteratively requesting input through the graphical conversational user interface for each parameter of the parameters identified in the graph definition of the function based on a traversal of the graph definition of the function and the user interface definition for the function; determining, based on a completeness graph associated with the function, that the requested inputs corresponding to the parameters identified in the graph definition of the function have been provided through the graphical conversational user interface; executing the function using the requested inputs as parameters for executing the function; and transmitting, to the graphical conversational user interface, a user interface definition including a result of executing the function.

Clause 10: The method of Clause 9, wherein the graph definition of the function comprises a plurality of nodes, each respective node being associated with a respective input parameter for the function and a respective user interface control to display in the conversational user interface to obtain a value for the respective input parameter.

Clause 11: The method of any one of Clauses 9 or 10, wherein executing the function using the requested inputs comprises executing the function based on a calculation graph defining an order of operations for the function based on the requested inputs.

Clause 12: The method of any one of Clauses 9 through 11, wherein receiving the request to execute the function through the graphical conversational user interface comprises: receiving an utterance through the graphical conversational user interface; identifying an intent from the received utterance; and identifying the function based on a mapping of functions and intents in the graphical conversational user interface.

Clause 13: A system, comprising: a memory having executable instructions stored thereon; and a processor configured to execute the executable instructions to perform the operations of any one of Clauses 1 through 12.

Clause 14: A system, comprising: means for performing the operations of any one of Clauses 1 through 12.

Clause 15: A computer-readable medium having instructions stored thereon which, when executed by a processor, performs the operations of any one of Clauses 1 through 12.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
    receiving a request to execute a function in a software application through a conversational user interface;
    retrieving, from a knowledge engine, a graph definition of the function, the graph definition of the function identifying parameters used in executing the function;
    iteratively requesting input through the conversational user interface for each parameter of the parameters identified in the graph definition of the function based on a traversal of the graph definition of the function;
    determining, based on a completeness graph associated with the function, that the requested inputs corresponding to the parameters identified in the graph definition of the function have been provided through the conversational user interface; and
    executing the function using the requested inputs as parameters for executing the function.

2. The method of claim 1, wherein the graph definition of the function comprises a plurality of nodes, each respective node being associated with a respective input parameter for the function and a respective user interface control to display in the conversational user interface to obtain a value for the respective input parameter.

3. The method of claim 2, wherein:
    each respective node of the plurality of nodes further indicates whether the respective input parameter is a mandatory input for the function, and
    iteratively requesting input through the conversational user interface for parameters identified in the graph definition of the function comprises repeating requests for mandatory inputs for the function until the mandatory inputs are provided through the conversational user interface.

4. The method of claim 1, further comprising retrieving, from the knowledge engine, a user interface definition for the function.

5. The method of claim 4, wherein the user interface definition for the function specifies, for each respective input of the requested inputs identified in the graph definition of the function, a prompt to display in the conversational user interface and a type of user interface control through which the respective input is to be entered.

6. The method of claim 1, wherein executing the function using the requested inputs comprises executing the function based on the requested inputs and a calculation graph defining an order of operations for the function.

7. The method of claim 1, wherein the request to execute the function comprises a request received through a voice recognition engine.

8. The method of claim 1, wherein receiving the request to execute the function through the conversational user interface comprises:
    receiving an utterance through the conversational user interface;
    identifying an intent from the received utterance; and
    identifying the function based on a mapping of functions and intents in the conversational user interface.

9. A system, comprising:
    a memory having executable instructions stored thereon; and a processor configured to execute the executable instructions to cause the system to:
receive a request to execute a function in a software application through a conversational user interface;
retrieve, from a knowledge engine, a graph definition of the function, the graph definition of the function identifying parameters used in executing the function;
iteratively request input through the conversational user interface for each parameter of the parameters identified in the graph definition of the function based on a traversal of the graph definition of the function;
determine, based on a completeness graph associated with the function, that the requested inputs corresponding to the parameters identified in the graph definition of the function have been provided through the conversational user interface; and
execute the function using the requested inputs as parameters for executing the function.

10. The system of claim 9, wherein the graph definition of the function comprises a plurality of nodes, each respective node being associated with a respective input parameter for the function and a respective user interface control to display in the conversational user interface to obtain a value for the respective input parameter.

11. The system of claim 10, wherein:
each respective node of the plurality of nodes further indicates whether the respective input parameter is a mandatory input for the function, and
in order to iteratively request input through the conversational user interface for parameters identified in the graph definition of the function, the processor is configured to repeat requests for mandatory inputs for the function until the mandatory inputs are provided through the conversational user interface.

12. The system of claim 9, wherein the processor is further configured to retrieve, from the knowledge engine, a user interface definition for the function.

13. The system of claim 12, wherein the user interface definition for the function specifies, for each respective input of the requested inputs identified in the graph definition of the function, a prompt to display in the conversational user interface and a type of user interface control through which the respective input is to be entered.

14. The system of claim 9, wherein in order to execute the function using the requested inputs, the processor is configured to execute the function based on the requested inputs and a calculation graph defining an order of operations for the function.

15. The system of claim 9, wherein the request to execute the function comprises a request received through a voice recognition engine.

16. The system of claim 9, wherein receiving the request to execute the function through the conversational user interface comprises:
receiving an utterance through the conversational user interface;
identifying an intent from the received utterance; and
identifying the function based on a mapping of functions and intents in the conversational user interface.

17. A method, comprising:
receiving a request to execute a function in a software application through a graphical conversational user interface;
retrieving, from a knowledge engine, a graph definition of the function, the graph definition of the function identifying parameters used in executing the function;
retrieving, from the knowledge engine, a user interface definition for the function;
iteratively requesting input through the graphical conversational user interface for each parameter of the parameters identified in the graph definition of the function based on (1) a traversal of the graph definition of the function and (2) the user interface definition for the function;
determining, based on a completeness graph associated with the function, that the requested inputs corresponding to the parameters identified in the graph definition of the function have been provided through the graphical conversational user interface;
executing the function using the requested inputs as parameters for executing the function; and
transmitting, to the graphical conversational user interface, a user interface definition including a result of executing the function.

18. The method of claim 17, wherein the graph definition of the function comprises a plurality of nodes, each respective node being associated with a respective input parameter for the function and a respective user interface control to display in the graphical conversational user interface to obtain a value for the respective input parameter.

19. The method of claim 17, wherein executing the function using the requested inputs comprises executing the function based on the requested inputs and a calculation graph defining an order of operations for the function.

20. The method of claim 17, wherein receiving the request to execute the function through the graphical conversational user interface comprises:
receiving an utterance through the graphical conversational user interface;
identifying an intent from the received utterance; and
identifying the function based on a mapping of functions and intents in the graphical conversational user interface.

* * * * *